July 28, 1970 C. W. BOWMAN 3,521,755
SEPARATING APPARATUS

Filed Nov. 26, 1968 2 Sheets-Sheet 2

INVENTOR
CLEMENT W. BOWMAN
BY
ATTORNEY 3,521,755
SEPARATING APPARATUS
Clement W. Bowman, Edmonton, Alberta, Canada, assignor of thirty percent each to Cities Service Athabasca, Inc., a corporation of Delaware, Imperial Oil Limited, a corporation of Canada, and Atlantic Richfield Corporation, a corporation of Pennsylvania, and ten percent to Royalite Oil Company, Limited, a corporation of Canada
Filed Nov. 26, 1968, Ser. No. 779,068
Int. Cl. B01d 21/06, 21/24
U.S. Cl. 210—520        8 Claims

ABSTRACT OF THE DISCLOSURE

An apparatus for separating a hydrocarbon material, preferably bitumen, as an emulsion from bituminous tar sands is disclosed herein. The apparatus comprises a tank with a solids withdrawal port in the bottom. A rotatable central feed tube is vertically mounted in the tank and connected to a slurry of water and tar sand supply conduit at the top, with a transversely mounted distributor arm supported perpendicularly to and communicatingly connected to the bottom of the feed tube. A number of outlets are located on the underside of the distributor arm with a dispersing means mounted adjacent each outlet.

---

Figure 1:
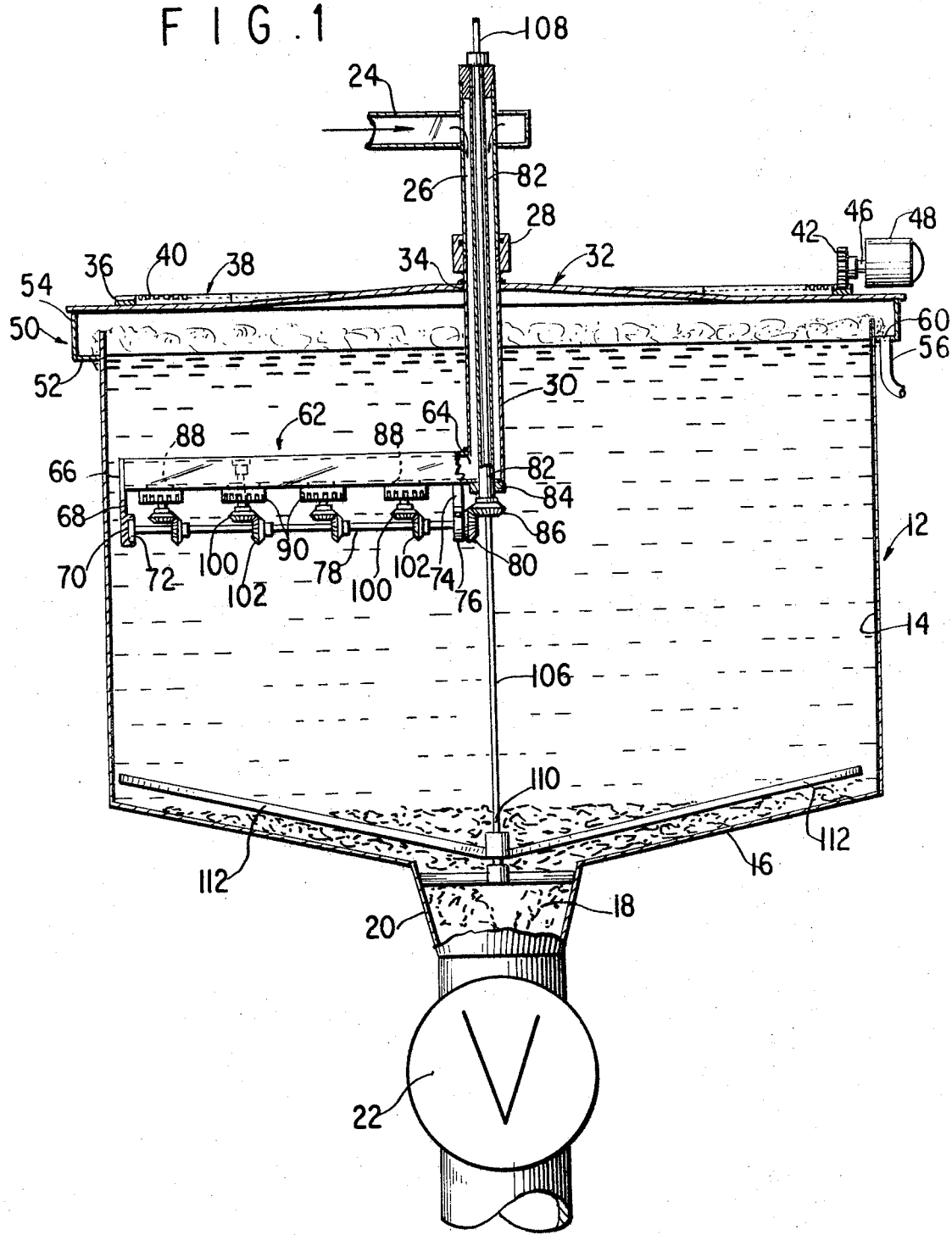

This invention relates to an extraction vessel or tank for separating hydrocarbon material from an aqueous slurry of solids and hydrocarbon material. More particularly this invention relates to an apparatus for separating a bituminous emulsion from an aqueous slurry of tar sand.

The invention is directed to an apparatus for uniformly dispersing and distributing a slurry of particulate solids and hydrocarbon materials in a separation vessel, separating the hydrocarbon material as an emulsion from the other solids, mostly sand, and removing the emulsion for further processing. Such separation apparatus is particularly useful in the production of synthetic crude oil from a mineral hydrocarbon material such as tar sand or oil shale.

The commercial production of a synthetic crude oil from various hydrocarbon mineral deposits such as shale oil and bituminous tar sand is becoming increasingly important. It is presently felt that by 1980 a significant proportion of the feed for refinery operations will be from these sources. It is therefore important in developing these resources, that the synthetic crude oil product obtained be economically comparable on a cost basis with natural crude.

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred herein as oil), from about 1% to about 10% of water, and from about 70% to about 90% of mineral solids. The specific gravity of the bitumen varies from about 1.0 to about 1.05 and the bitumen has an API gravity of about 8.0°. This value of specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller size mineral solid material is referred to as "fines" and it contains clay and silt including some very small particles of sand. The fines content typically varies from about 5% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water to recover an emulsion, or froth, which contains some of the fines and quantities of coarse sand. Such an emulsion or froth is referred to herein as a bituminous emulsion.

One well-known method for preparing such emulsions is often referred to as the "hot-water process." In the hot-water process, the bituminous sand is slurried with steam and hot water and the pulp is then agitated with a stream of circulating hot water and carried to a separation apparatus maintained at an elevated temperature of about 180° F. In the separation apparatus, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

Understandably, all the different operations in treating the tar sands to obtain a synthetic oil must be maximized to efficiently and economically produce the oil and it is therefore important that each step and treatment be adequate to obtain maximum yield at a minimum cost. The separation apparatus therefore must be able to handle significant quantities of slurry at a minimum cost and yield maximum efficiency. For best results it is important that the slurry material be evenly spread over the whole cross-sectional area of the separation vessel to allow for maximum separation by gravity floatation of the bituminous emulsion from the sand and other solids. However, as the separation apparatus is scaled up to handle larger and larger volumes of material, it has been found that it becomes increasingly difficult to distribute the slurry feed material evenly throughout the cross-sectional area of the separation zone in the separation tank.

Accordingly, I have invented an apparatus for separating hydrocarbon material, preferably bitumen, as an emulsion from a mixture of the hydrocarbon material, sand and water. Briefly, the apparatus comprises a tank having a solid withdrawal means in the bottom thereof, a transversely mounted distributor arm in the tank having a plurality of outlets on the arm bottom, feed means connected to the distributor arm for feeding the mixture of hydrocarbon material, sand and water into the distributor arm, means for moving the distributor arm transversely in the horizontal plane, and dispersing means mounted adjacent each of the outlets for agitating and dispersing the mixture passing out of each of the outlets into the tank.

It is therefore an object of this invention to provide an apparatus for the separation of bituminous emulsion from a slurry of tar sand and water.

Another object of this invention is to provide an apparatus for dispersing and distributing a mixture of the bituminous sand and water as a slurry in a separation tank.

Still another object of this invention is to provide an apparatus capable of slurrying tar sand, and separating a bituminous emulsion therefrom.

Other objects and advantages in the apparatus of this invention will become apparent to those skilled in the art from the description of the drawings and preferred embodiments which follow.

Figure 2:
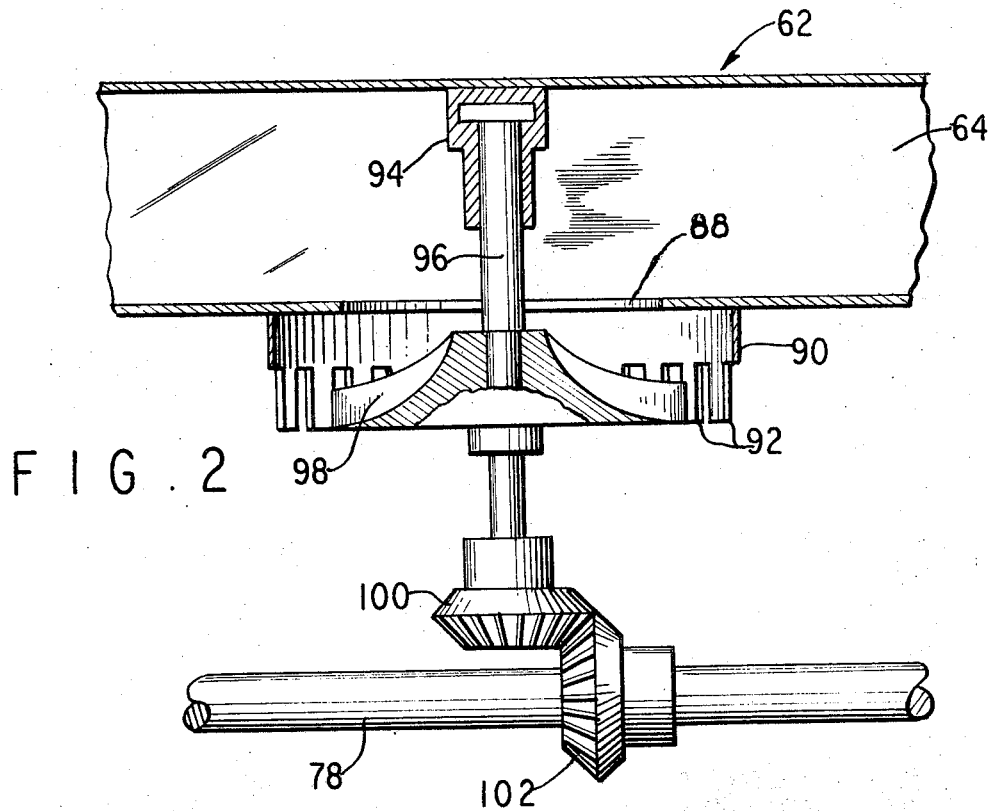
Figure 3:
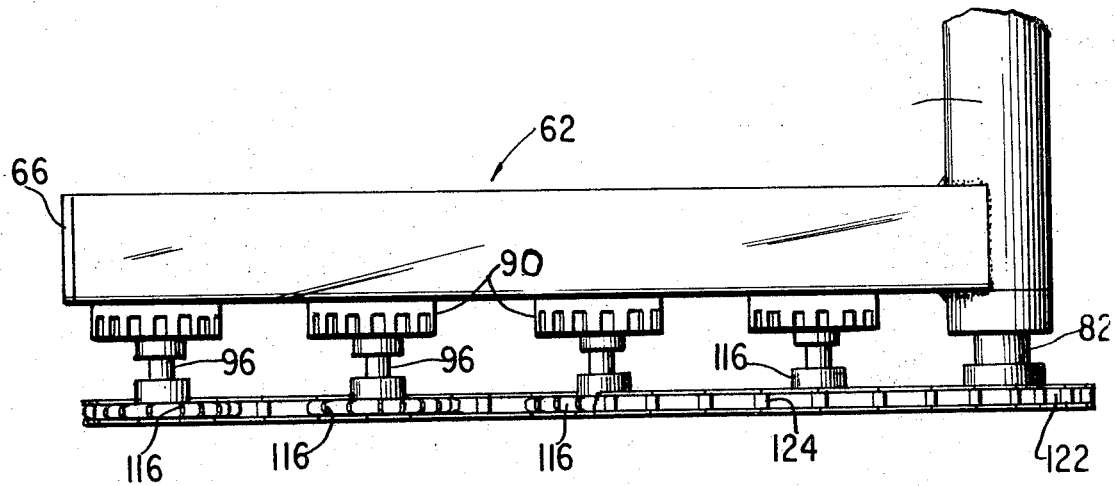

FIG. 1 of the drawings shows an elevational, cross-sectional view of the separation tank of this invention;

FIG. 2 shows a larger view of one version of an impeller drive for the apparatus of this invention; and FIG. 3 shows another version of an impeller drive for use in the apparatus according to the present invention.

With reference to FIG. 1 of the drawings, a separation tank 12 is shown and comprises a vertically mounted cylindrical side wall 14 and a bottom wall 16. The bottom wall 16 is attached at its circumferential edge to the bottom of the cylindrical side wall and slopes downwardly from the circumferential edge towards the center of the tank. A discharge port 18 is located in the center of the bottom wall 16, and is attached to a discharge conduit 20. A discharge valve 22 is mounted in the discharge conduit 20 and serves to control the withdrawal of sand and other solids from the bottom of the tank 12.

Mounted above the tank 12 and firmly attached to a static support, not shown, is a horizontal feed pipe 24. The feed pipe 24 is connected to the top of a stationary vertical feed tube 26 which extends downwardly toward the separation tank and is mounted along a vertical axis drawn through the center of the tank 12. The stationary feed tube 26 has at its bottom end an attached rotatable sealed joint 28 to which is attached the upper end of a rotatable feed tube 30 having a similar diameter to the stationary feed tube 26. Just below the rotatable sealed joint 28 is a relatively flat horizontally mounted tank cover 32 having a centrally located hole 34 therethrough which is slightly larger than the outside diameter of the rotatable feed tube 30. The rotatable feed tube extends through the central hole 34 and is fixedly attached as by welding or similar means to the tank cover 32.

As described above, the cover 32 is rotatively mounted above the top of the tank 12 and extends outward in the horizontal plane a distance somewhat beyond the side wall 14 and edge of the tank 12. Mounted on the top surface of the vessel cover 32 at its outer edge is an annular cover drive rack 36, formed by plurality of semicircular gear rack segments 38 each having a number of teeth 40 thereon. A pinion gear 42 is mounted on a motor shaft 46 in rotating contact with the cover drive rack 36 and serves to rotate the top cover 32 when the pinion gear is rotated. The motor shaft 46 is attached to a motor 48 which acts as a primary motive power source for the separation apparatus of this invention.

On the outside wall 14 of the vessel at the top thereof, an emulsion removal trap 50 is formed by a flat horizontal ring 52 welded to the outside of the side wall 14 below the circumferential edge of the vessel cover 30. An upright rim 54 is attached to the top of the outside edge of the flat horizontal ring 52 and serves to retain the overflow from the vessel. The overflow is removed from the trap 50 by an emulsion drawoff conduit 56 which is connected to an opening 60 in the bottom of the ring 52. The bottom surface of the circumferential edge of the tank cover 32 is in sliding contact with the top surface of the rim 54 and is lubricated if necessary by overflow from the emulsion.

The rotatable feed tube 30 extends downwardly through the tank to a point somewhat above the vertical midpoint of the tank 12 where it is connected to a horizontal distributor arm 62. The distributor arm 62 is cantilevered from and supported by the rotatable feed tube 30 at the bottom thereof. The arm is in the form of a hollow tube 64 communicatingly connected to the feed tube and extending perpendicularly outwards from the rotatable feed shaft 28 towards the side wall 14 of the vessel. The distributor arm 62 has an end plate 66 which forms a tight and rigid seal at the end of the hollow tube. The end plate 66 has an extension 68, extending downwardly a short distance below the distributor arm and having a socket 70 located therein, in which a journal 72 is centrally mounted each having an axis parallel to the axis of the arm 62.

A hanger 74 in the form of a bracket is attached at its top edge to the bottom of the distributor arm 62 adjacent the connection of the arm to the rotatable feed tube. A horizontally mounted journal 76 is attached to the bottom of the hanger 74 on the same axis and at the same height as the journal 72 mounted in the end plate extension 68. A horizontal drive shaft 78 is rotatably mounted at one end in the end plate journal 72 and extends at the other end through the hanger journal 76 to a point adjacent to the bottom of the rotatable feed tube. A bevel gear 80 is attached to that end of the drive shaft 78 adjacent the feed tube.

Within the stationary and rotatable feed tubes is a hollow rod 82 which is fixedly mounted to the top of the stationary feed tube 26 and extends downwardly through the bottom end of the rotatable feed tube 30 to just above the axis of the horizontal drive shaft 78. A pinion bevel gear 86 in mating contact with the shaft bevel gear 80 is mounted on the end of the hollow rod 82 so that as the distributor arm is swept in a horizontal path by the rotation of the rotatable feed shaft, the shaft bevel gear 80 will be rotated by gear to gear contact with the pinion gear 86 in turn causing the horizontal drive shaft to rotate.

A plurality of circular outlets 88 are located at the bottom of the distributor arm 62, four being specifically shown in the drawing. An annular flange 90 (FIG. 2) is coaxially mounted around each of the outlets and is attached to the bottom of the distributor arm. Each of the flanges 90 has a multiplicity of square teeth 92 on the bottom periphery thereof.

Four longitudinally shaped impeller shaft journals 94 are attached at their closed ends to the bottom side of the inside top wall of the distributor arm tube 64 and each of the journals 94 being located coaxially with each of the outlets 88. Each of the shaft journals 94 serve as bearings and supports for impeller drive shafts 96 which each extend vertically and coaxially through each of the outlets 88 to a point adjacent the horizontal drive shaft 78. An impeller 98 is fixedly mounted on the impeller drive shaft 96, adjacent the multiplicity of teeth 92 on the annular flange 90 so that fluid passing through each of the outlets will be acted upon by the respective impeller as it is rotated in the outlet and caused to impinge on the multiplicity of teeth. Attached to the bottom of each of the impeller drive shafts 96 is an impeller drive gear 100, which is held in tooth to tooth contact with one of four corresponding bevel power takeoff gears 102 each mounted on the horizontal drive shaft 78. In operation the rotation of the feed tube by the cover will move the distributor arm and horizontal drive shaft in a horizontal path about the feed tube and the fixed hollow rod. The horizontal path followed by the horizontal drive shaft will cause the drive shaft gear 80 to rotate as it moves around the pinion bevel gear 86, consequently rotating the drive shaft and the take-off gears 102 mounted thereon. In turn the power take-off gears 102 will transmit angular rotation to each of the mating impeller drive gears thereby causing each of the impellers to rotate and impart a shearing and dispersing action to material passing through each of the outlets.

Rotatingly mounted within the hollow rod 82 is a rake drive shaft 106 which extends beyond the upper and lower ends of the rod. The top 108 of the rake drive shaft is connected to a rotational drive means, not shown, such as a direct drive motor. The bottom 110 of the rake drive shaft extends down to a point just above the bottom wall 16 of the tank where two upwardly inclined rakes 112 are centrally connected to the drive shaft. The rotation of the drive shaft 106 moves the two rakes 112 in a horizontal path which effectively sweeps the bottom of the tank at a point just above the bottom wall 16 and cause solids to move towards the discharge conduit 20.

For purpose of elaboration on the various modifications inherent in the apparatus of this invention, another variation of means for rotatably driving the impellers, specifically a chain drive, is shown in FIG. 3 of the drawings where similar elements are denoted by the same reference number. The chain drive comprises a drive sprocket 122 which is fixedly attached to the bottom of the hollow rod 82. The end cover 66 is modified so as not to have the extension 68 and the hanger 74 is also not present in this version of the apparatus. In place of the impeller shaft gears 100 a driven sprocket 116 is fixedly attached to the bottom of each of the impeller drive shafts 96. An endless drive chain 124 in mating contact with the drive sprocket 122 and the driven sprockets 116 provides a means for translating the horizontal motion of the distributing arm into rotary motion of the impellers.

In operation either water and tar sand separately or an aqueous slurry of water and tar sand is fed into the distributor arm via the feed tubes as the motor rotationally drives the cover and the rotatable feed tube. In turn, the rotation of the feed tube carries the distributor arm in a horizontal path over substantially the whole cross-sectional area of the tank. The rotation of the impellers in conjunction with the multiplicity of teeth on the annular flange 90 act to shear and disperse the material passing through each of the outlets into the body of the tank. Small droplets of aerated bitumen being lighter than water tend to rise within the vessel above the aqueous phase and float on top of the water as an emulsion or froth. The emulsion overflows over the upper edge of the walls 14 into the trap 50 and out of the separation tank via drawoff conduit 56. Sand sinks by gravity to the bottom of the tank where the rakes 112 act to sweep the particles of sand and other solids to the bottom center of the vessel and into the discharge conduit 20. The sand and water is removed from the vessel by opening the discharge conduit 20.

In summary the present apparatus provides an improved large separation apparatus having a multiplicity of outlets in which are mounted dispersing and shearing means but without the necessity of providing a complex series of shearing means over the whole cross-section of the vessel.

Wherefore, having described the present invention as regards specific preferred embodiments thereof and wishing to cover those modifications and variations which are apparent to those skilled in the art without departing from the spirit and scope thereof. For instance, the area of the outlets near the outer end of the distributor arm is preferably greater than the area of the outlets near the inner end of the arm because of the larger cross-sectional area of the separation vessel being swept by the openings near the outer end of the arm. This may be done by varying the size or spacing of the openings. Also, more than one distributor arm may be used if desired.

I claim:

1. Apparatus for separating a hydrocarbon emulsion from an aqueous slurry of hydrocarbon material and particulate solids, said apparatus comprising:

a tank having a solids withdrawal means in the bottom thereof;

a transversely mounted distributor arm in said tank and having a plurality of outlets;

slurry feed means communicatingly connected to said distributor arm for feeding the aqueous slurry into the distributor arm;

means for moving said distributor arm transversely in the horizontal plane; and dispersing means mounted adjacent each of said outlets for agitating and dispersing the aqueous slurry passing out of each of the outlets into the tank, said dispersing means comprising: an annular flange mounted on said distributor arm coaxially with each of said outlets, said annular flange having a multiplicity of teeth at the end opposite of the outlet;

an impeller rotatably mounted coaxially with said annular flange, said impeller being adjacent said multiplicity of teeth; and a means for rotating each of the impellers as the distributor arm is moved transversely in the horizontal plane.

2. The apparatus of claim 1 wherein said apparatus additionally comprises a rake mounted transversely above and in spaced relationship to the bottom of the tank and means for rotating said rake in the horizontal plane, whereby solids accumulated in the bottom of the tank are raked to direct the solids toward the solids withdrawal means.

3. Apparatus for separating a hydrocarbon emulsion from an aqueous slurry of hydrocarbon material and particulate solids, said apparatus comprising:

a tank having a solids withdrawal means in the bottom thereof;

a transversely mounted distributor arm in said tank, said distrbiutor arm having a plurality of outlets;

dispersing means mounted adjacent each of said outlets for agitating and dispersing the aqueous slurry passing out of each of said outlets into the tank;

slurry feed means for feeding the aqueous slurry into the distributor arm, said slurry feed means comprising a vertical feed conduit communicatingly connected at the top end to a slurry inlet and at the bottom to the distributor arm, and having a hollow rod coaxially and fixedly mounted therein, said rod including means for driving said dispersing means at its lower end; and means for moving the distributor arm transversely in the horizontal plane.

4. The apparatus of claim 3 wherein said dispersing means comprises:

an annular flange mounted on said distributor arm coaxially with each of said outlets, said annular flange having a multiplicity of teeth at the end opposite the outlet;

an impeller rotatably mounted coaxially with said annular flange, said impeller being adjacent said multiplicity of teeth; and a means for rotating each of the multiplicity of impellers as the distributor arm is moved transversely in the horizontal plane.

5. The apparatus of claim 3 wherein said dispersing means comprises a rotationally driven impeller axially mounted at each of said distributor arm outlets, each such impeller being rotationally coupled by a right angle drive to a horizontal drive shaft rotationally mounted below said arm, said horizontal drive shaft having a gear at its end adjacent the rod drive means whereby rotation of the feed conduit moves the distributor arm and the drive shaft in the horizontal plane causing the drive shaft gear to rotate about the rod drive means, and rotate the impellers.

6. The apparatus of claim 3 wherein said dispersing means comprises a rotationally driven impeller axially mounted at each of said distributor arm outlets, each of said impellers being coupled to a driven sprocket, an endless sprocket drive chain in mating contact with each of said driven sprockets and with a drive sprocket, said drive sprocket being mounted on said rod at the lower end thereof, whereby each of said impellers is rotationally driven as the distributor arm rotates about said hollow rod.

7. The apparatus of claim 3 wherein said apparatus additionally comprises a rake mounted transversely above and in spaced relationship to the bottom of the tank, and means for rotating said rake in the horizontal plane, whereby solids accumulated in the bottom of the tank are raked to direct the solids toward the solid withdrawal means.

8. Apparatus for separating a hydrocarbon emulsion from an aqueous slurry of hydrocarbon material and particulate solids, said apparatus comprising:
   a tank having a solids withdrawal means in the bottom thereof;
   a transversely mounted distributor arm in said tank and having a plurality of outlets;
   slurry feed means communicatingly connected to said distributor arm for feeding the aqueous slurry into the distributor arm;
   means for moving said distributor arm transversely in the horizontal plane;
   dispersing means mounted adjacent each of said outlets for agitating and dispersing the aqueous slurry passing out of each of the outlets into the tank, said dispersing means comprising an impeller rotatably mounted coaxially with each of said outlets, and means for rotating each of the impellers as the distributor arm is moved transversely in the horizontal plane.

References Cited

UNITED STATES PATENTS

| | | | |
|---|---|---|---|
| 2,263,167 | 11/1941 | Dorr et al. | 210—520 |
| 2,263,168 | 11/1941 | Dorr et al. | 210—520 |

JAMES L. DECESARE, Primary Examiner

U.S. Cl. X.R.

210—528